United States Patent [19]

Hepworth

[11] Patent Number: 4,630,628

[45] Date of Patent: Dec. 23, 1986

[54] FLOW CONTROL APPARATUS

[75] Inventor: Ian C. Hepworth, Norley, England

[73] Assignee: British Nuclear Fuels plc, Risley, England

[21] Appl. No.: 607,823

[22] Filed: May 7, 1984

[30] Foreign Application Priority Data

May 24, 1983 [GB] United Kingdom ................. 8314319

[51] Int. Cl.$^4$ ............................................... F17D 3/00
[52] U.S. Cl. ......................................... 137/12; 137/14; 137/403; 137/172; 252/627; 252/631; 422/106; 422/112; 422/159; 422/256; 423/658.5; 423/7; 423/DIG. 14
[58] Field of Search ............... 422/106, 256, 257, 112, 422/310, 142, 242, 260, 159; 137/386, 406, 407, 403, 12, 14, 172; 423/6, 7, 658.5, DIG. 14; 252/631, 627, 623

[56] References Cited

U.S. PATENT DOCUMENTS

| | | | |
|---|---|---|---|
| 2,160,062 | 5/1939 | Drake et al. | 422/106 |
| 2,435,745 | 5/1941 | Ittner | 422/242 |
| 3,909,205 | 9/1975 | Jones | 422/50 |
| 4,239,730 | 12/1980 | Fahlvik et al. | 422/112 |

FOREIGN PATENT DOCUMENTS 113946 7/1898 Fed. Rep. of Germany.

Primary Examiner—Barry S. Richman
Assistant Examiner—Titus B. Ledbetter, Jr.
Attorney, Agent, or Firm—William R. Hinds

[57] ABSTRACT

Apparatus for maintaining the level of an interface between separate phases in a solvent extraction column by regulating the flow from the base of the column. A steady controllable flow is achieved by passing the flow into a pressure vessel and the level in the vessel is controlled by having a plurality of vertically spaced apart apertures in the flow path within the vessel.

5 Claims, 1 Drawing Figure

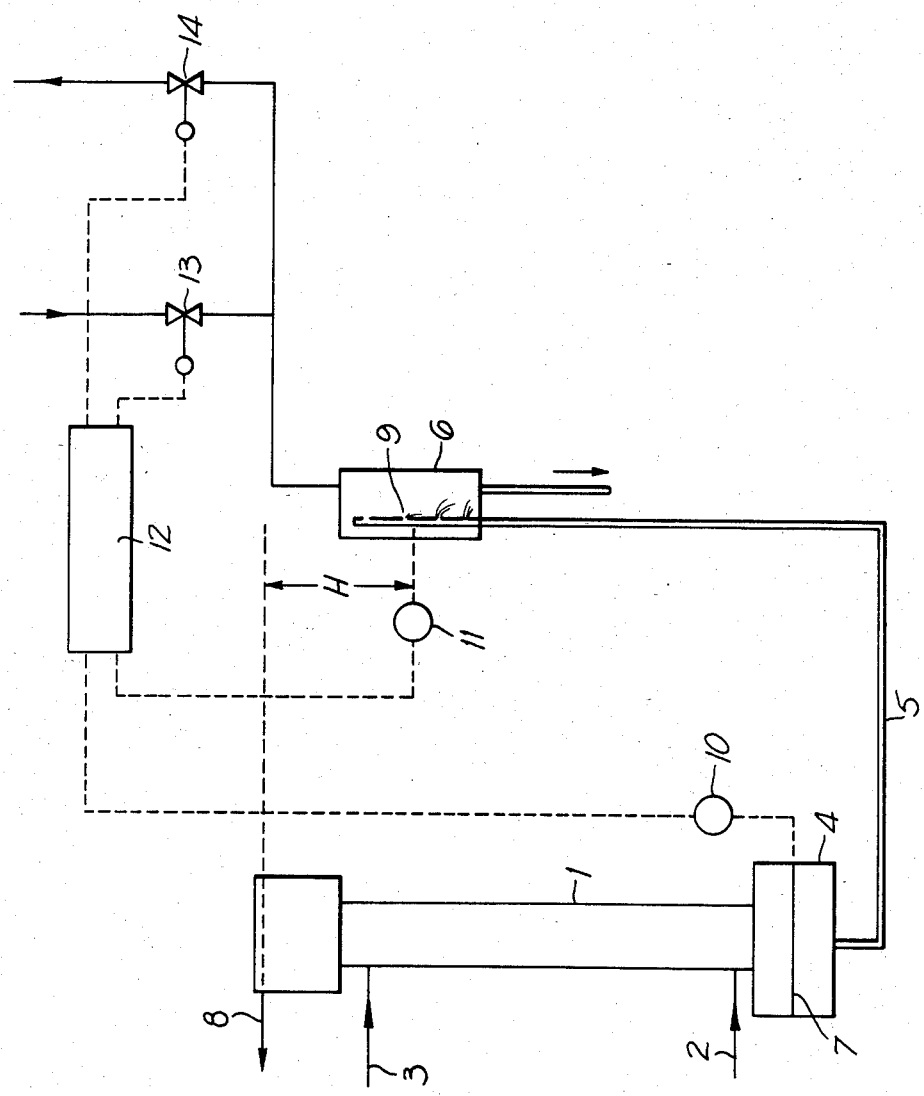

FLOW CONTROL APPARATUS

The present invention concerns flow control apparatus.

BACKGROUND OF THE INVENTION

Solvent extraction techniques are used to separate uranium and plutonium from fission products and impurities during the reprocessing of irradiated nuclear fuel elements. The fuel elements are dissolved in nitric acid to provide an aqueous feed which is introduced at the top of an extractor column. An organic solvent is introduced at the bottom of the column and the aqueous and organic phases flow in opposite directions through the column and are brought into intimate contact with each other. A packed or plated column can be employed with the lighter organic phase flowing up the column to mix with the heavier aqueous phase flowing down the column. The column can be pulsed to reduce its height and to increase the efficiency of the mixing and extraction.

In one type of column, aqueous raffinate leaves the bottom of the column and solvent containing uranium and plutonium is drawn off at the top of the column. The level of the interface at the bottom of the column between the admixed aqueous and solvent phases and the aqueous phase is maintained by regulating and controlling the flow-rate of the aqueous raffinate leaving the bottom of the column. It is known to effect such flow control by passing the raffinate into a vessel containing a weir, the head of liquid flowing through the weir and hence liquid flowrate being controlled by fine adjustments to the vessel internal pressure. However, the sensitivity and degree of control possible with a weir is very limited.

FEATURES AND ASPECTS OF THE INVENTION

According to the present invention a flow control apparatus for maintaining the level of an interface between separate phases in a solvent extraction column comprises a pressure vessel located outside the column at an elevated position with respect to the interface, a conduit extending between the base of the column and the base of the pressure vessel and in which a flow path within the vessel is formed by a plurality of vertically spaced apart apertures. Thus the interior of the vessel can be divided into an inlet chamber and an outlet chamber separated by a barrier having a number of apertures each at a different height with respect to the base of the vessel. Alternatively, an inlet pipe can rise through the base of the vessel and have a series of spaced apart apertures along its length within the vessel.

DESCRIPTION OF THE DRAWING

The invention will be described further, by way of example, with reference to the accompanying diagrammatic drawing of an extractor column and control vessel.

DESCRIPTION OF THE PREFERRED EMBODIMENT

An extractor column 1, preferably a pulsed column, has an inlet 2 for an organic solvent at its lower end and an inlet 3 for an aqueous flow at its upper end. In operation, the lighter solvent flows up the column 1, which can be packed or plated, to intimately mix with the heavier aqueous flow down the column. In a nuclear fuel reprocessing plant the aqueous flow can comprise irradiated fuel elements dissolved in nitric acid and the solvent flow extracts the uranium and plutonium from the aqueous flow. Aqueous raffinate flows out of the bottom of the column along pipe 5 to enter a pressure vessel 6. It is required to maintain interface 7 between the mixed aqueous and solvent phases in the column and the aqueous phase in chamber 4 at the bottom of the column at a substantially constant level within the chamber 4. This is achieved by regulating and controlling the flow of aqueous raffinate from the column.

Solvent phase overflows from the top of the column through an outlet pipe 8 and the head H, that is the difference in levels between the surface of the solvent phase, determined by the position of the outlet pipe 8, and the surface of the raffinate within the vessel 6 is maintained by applying gas under pressure to the interior of the vessel 6. The head H can be maintained by regulating and controlling the raffinate flow by appropriate adjustment of the applied pressure in the vessel 6. A control signal is derived from a measurement of both the level of the raffinate in the vessel 6 and the position of the interface 7. It is desirable to locate the vessel 6 as high as possible, (that is to minimize the head H), in order to reduce the required pressure within the vessel 6 and to increase sensitivity of control.

A sensitive control of the level of raffinate in the pressure vessel 6 can be achieved by vertically extending the pipe 5 into the interior of the vessel 6 and forming a plurality of apertures 9 spaced apart at predetermined intervals along the length of the pipe within the vessel. Alternatively, the interior of the vessel can be divided into an inlet compartment communicating with the pipe 5 and an outlet compartment, the compartments being separated by a wall having apertures at different levels or heights with respect to the base of the vessel.

The size and spacing of the apertures are chosen such that in normal operation the raffinate can flow through two or more apertures, the flow rates decreasing with height of the apertures. The use of a plurality of apertures results in a sensitive control and minimises the risk of partial or total blockage of the apertures. The size and spacing of the apertures can be chosen to suit the working requirements of the column. Conveniently, the apertures can be arranged such that the spacing decreases with height of the apertures.

In the drawing, the positions of the interface 7 and the surface of the raffinate in the vessel 6 are detected by level indicators 10 and 11 respectively. The indicators actuate a controller 12 which controls adjustable valves 13 and 14. Valve 13 regulates the supply of gas into the vessel 6 and valve 14 is in a line from the vessel 6 venting to atmosphere.

I claim:

1. In combination, a vertical solvent extraction column in which an interface between a light phase and a heavy phase forms during operation, flow control means for maintaining the level of the interface at a predetermined level and an outlet for the light phase, said flow control means comprising a pressure vessel located outside the column at an elevated position relative to the predetermined interface level, means forming a flow path between the base and interior of the solvent extraction column and the base and interior of the pressure vessel to permit flow from the column to enter the pressure vessel, means having a plurality of vertically spaced apart apertures in the flow path within the vessel so that fluid entering the vessel will sequentially reach and flow in parallel through the apertures depending on the liquid level in the flow path within the vessel, and means for selectively varying the pressure within the vessel to control the liquid level in the flow path in the vessel, and hence for varying the parallel flow through the apertures, so that the interface in the column is maintained at the predetermined level.

2. Apparatus as claimed in claim 1 wherein said flow path includes a conduit extending upwardly within the vessel, the apertures being provided in the extension of the conduit that is within the vessel.

3. Apparatus according to claim 1 wherein the flow path includes a wall within the vessel, the apertures being formed in the wall.

4. Apparatus as claimed in claim 1 wherein said solvent extraction column includes an inlet at an upper part of the column for a relatively heavy aqueous feed, an inlet at a lower part of the column for a relatively lighter solvent feed, an outlet at the base of the column for aqueous raffinate connected with said flow path, and an outlet at the top of the column for solvent containing extractants.

5. A method of controlling the level of an interface between a light phase and a heavy phase in a vertical solvent extraction column comprising locating a pressure vessel outside the column at an elevated position with respect to the interface, and locating an outlet for the light phase above the bottom of the column, providing a flow connection between the bottom and interior of the column and the bottom and interior of the vessel to permit flow from the column to enter the vessel, arranging a means having a plurality of vertically spaced apart apertures in parallel flow relationship in the flow path in the vessel so that fluid entering the vessel will sequentially reach and flow in parallel through the apertures depending on the liquid level in the flow path within the vessel, and selectively varying the pressure within the vessel to control the liquid level in the flow path in the vessel and hence to control the parallel flow through the apertures, so that the interface is maintained at a substantially constant level.

* * * * *